Sept. 20, 1966  F. C. ROSCH, JR., ET AL  3,273,851
BALL VALVE HAVING URGING MEANS ACTING NORMAL THERETO
Filed May 23, 1963
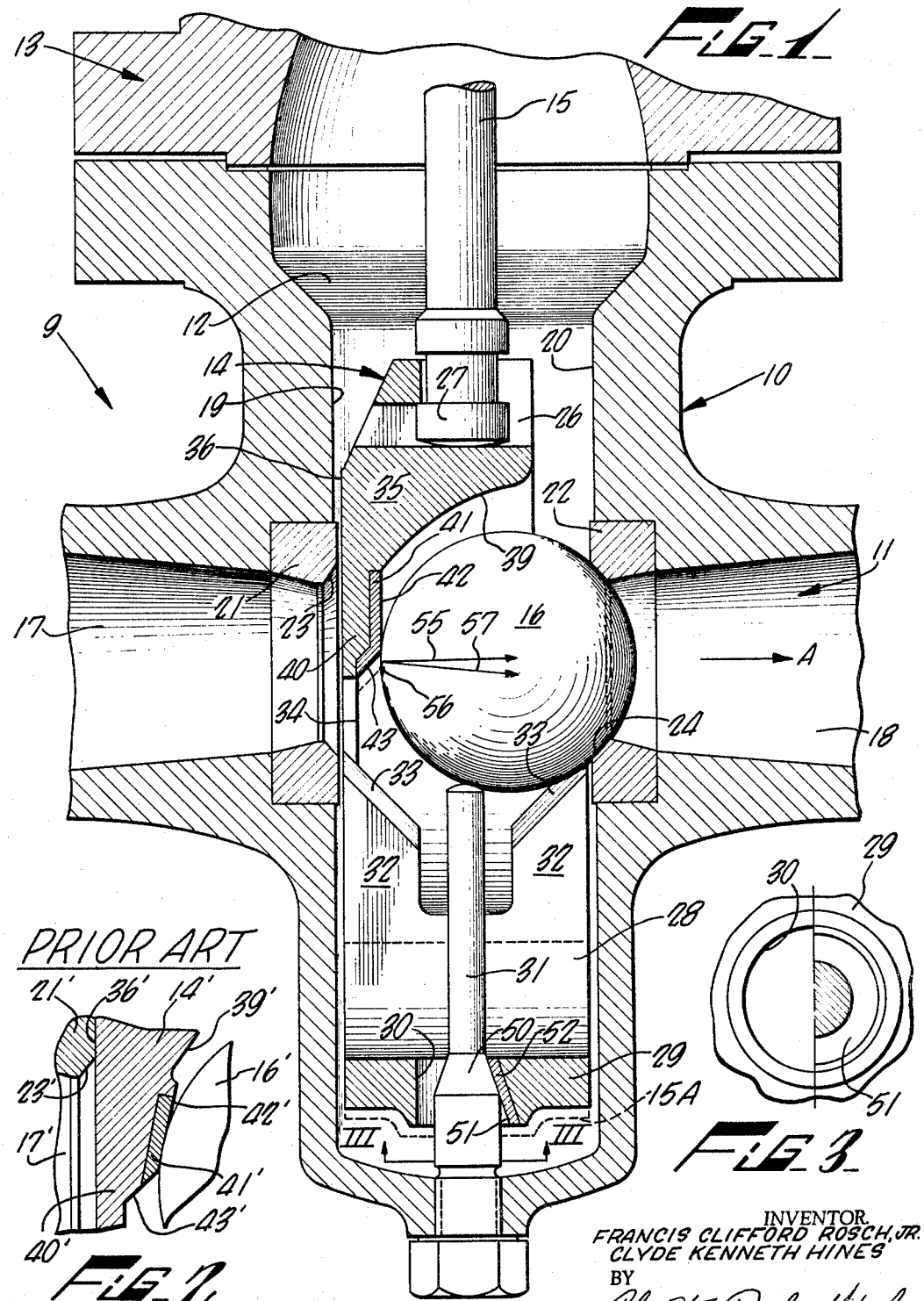
INVENTOR.
FRANCIS CLIFFORD ROSCH, JR.
CLYDE KENNETH HINES
BY
Christie, Parker Hale
ATTORNEYS.

United States Patent Office 3,273,851
Patented Sept. 20, 1966

3,273,851
BALL VALVE HAVING URGING MEANS ACTING NORMAL THERETO
Francis Clifford Rosch, Jr., Bridgeport, and Clyde Kenneth Hines, Southport, Conn., assignors to Consolidated Electrodynamics Corporation, Pasadena, Calif., a corporation of California
Filed May 23, 1963, Ser. No. 282,621
9 Claims. (Cl. 251—124)

This invention relates to controllable ball valves for controlling the flow of fluids.

The present invention constitutes an improvement over certain types of valves disclosed in Patent 2,629,578, issued February 24, 1953 to H. L. Paul, Jr., and Patent 2,666,617, issued January 19, 1954, to H. L. Paul, Jr. These patents are relied on to show the environment in which the present invention finds utility and to show the basic operational principles of such valves.

The patents referred to above disclose valves having a straight fluid passage with converging and diverging walls forming a venturi. A recess intersects the straight fluid passage at the throat passage of the venturi forming, in effect, opposed throats or seats. A ball is contained in the recess and is moved by an actuator to open and close the valve. The actuator comprises a forked yoke having a hood portion straddling the flow space between the throats and bridging the throats to reduce turbulence in the fluid flowing through the valve. The yoke has wedges engagable between the ball and the seat to unseat the ball. The actuators in the valves disclosed in the referenced patents also have locking wedges for locking the balls against their seats.

It has been found that the amount of force applied to the stem of such valves is particularly critical in effecting proper engagement between the ball and its seat. If the stemload is too light, proper seating is not accomplished. On the other hand, if the stemload is too great, it has been found that the seat is deformed by an eccentric loading of the ball against the seat such that the valve leaks; additional force applied to the ball merely compounds the mismatch between the ball and its seat.

Mechanical ball seating means are required in such valves in order to provide a fully closed nonleaking condition of the valve.

The present invention provides an improved seating mechanism in valves of the type disclosed in the referenced patents. The improved seating mechanism provides that proper engagement of a ball with its seat is relatively unaffected by the amount of force applied to the valve stem. Accordingly, the operator of the valve need not be carefully instructed in proper operation of the valve.

Generally speaking, the present invention resides in a valve having a casing defining a fluid flow passage therethrough and a recess intersecting the flow passage. The passage defines inlet and outlet openings to the recess. An annular valve seat is disposed peripherally of one of the openings. A ball is disposed in the recess and selectively operable means are provided in the recess for moving the ball into and out of closure relation with the valve seat. The improvement provided by the present invention comprises means acting on the ball in a direction substantially normal to the valve seat in response to movement of the selectively operable means for urging the ball into intimate sealing contact with the valve seat.

These and other features of the present invention will be more clearly understood from the following detailed description and explanation of the invention taken in conjunction with the accompanying drawings wherein:

FIG. 1 is a cross-sectional elevation view of a preferred embodiment of the invention;
FIG. 2 is a fragmentary cross-sectional elevation of a portion of a similar valve according to the prior art; and
FIG. 3 is a bottom plan view of the actuator of the improved valve taken along line III—III of FIG. 1.

Referring now to the drawings, a valve 9 comprises in general a valve casing 10 having a through fluid passage 11 intersected by a traverse recess 12, the latter being closed by a bonnet 13. A forked cage-like actuator 14, operated by a reciprocal valve stem 15, is disposed in recess 12 for reciprocal movement in the recess toward and away from a limiting position 15A represented by the dashed lines of FIG. 1. A ball 16 is carried by the actuator for movement of the ball into and out of closure relation with its seat in response to movement of the actuator toward and away from its limiting position which corresponds to the full closed condition of the valve.

Fluid flow passage 11 preferably includes a converging conduit 17 and a diverging conduit 18, assuming the fluid flow to be in the direction of arrow A. The conduits preferably are of circular cross-section throughout and are of equal length and originate and terminate, respectively, in flanges (not shown) by which the valve casing is coupled to connecting pipes (not shown) in any conventional manner, as by welding or by bolts.

The converging and diverging passages 17 and 18 form, in effect, a venturi whose throat space is intersected by transverse recess 12. The recess has flat and preferably parallel side walls 19 and 20 into which fluid flow passage portions 17 and 18 open, respectively. Each passage portion 17 and 18 has its opening into recess 12 defined by one of a pair of identical annular seat rings 21, 22, respectively. Each seat ring may be fabricated from material which is harder than ball 16 and defines an annular ball seating surfaces 23, 24, respectively, which open toward each other transversely of recess 12. The seating surfaces may be conical, as shown, or may be spherically ground to mate intimately with ball 16. The seat rings form constricted throats for the venturi of the valve casing. As shown in FIG. 1, seat rings 21 and 22 have opposing surfaces which preferably are planar and are disposed parallel to, but inwardly toward recess 12 of, recess walls 19 and 20, respectively. Surface 23, 24 defines a seat for ball 16 which lies generally on a plane normal to the extent of fluid flow passage 11 and parallel to the direction of reciprocal movement of the actuator. It is understood, of course, that only one of these seats is relied upon for a given dispoistion of actuator 14 in the recess.

In the preferred embodiment of the invention illustrated in FIG. 1, both passage portions 17 and 18 are equipped with a seat ring peripherally of the opening of the respective passage portion into recess 12. It is within the scope of the present invention, however, that only the upstream or the downstream opening of the passage into the recess may be fitted with a seat ring, the seat ring defining a seating surface for valve ball 16.

Actuator 14 is nonrotatably but slidably mounted in recess 12. The upper end of the actuator defines a T-slot 26 in which a flange 27 of stem 15 is engaged for controlling reciprocal movement of the actuator. The actuator preferably is in the form of a cage comprised of a yoke 28 at the lower end of the actuator having a hood portion 29 whose bottom inner surface is semicylindrical so that it may straddle the flow space between passage portions 17 and 18 when the valve is in the full open position. Hood 29 is laid out on the same radius as the smaller radius of seat rings 21, 22 (or on a slightly larger radius) and is substantially flush with the bottom and sides of the openings of the flow passage into recess 12 when the valve is in its full open position. The hood thus provides confining walls for the main fluid stream passing through the valve to reduce turbulence of the fluid as it passes through the valve. The hood has an aperture 30 formed therethrough to accommodate a spindle 31 defining guide projection means more fully described below.

Hood 29 terminates in four legs 32 (only two of which are shown in FIG. 1) whose ends have tapered end wedges or pads 33 engageable with ball 16 for purposes hereinafter described in more detail. Also rising from hood 29 are a pair of outwardly off-set side stirrups 34 (only one of which is shown in FIG. 1) which support at their upper ends a crossbar portion 35 extending transversely of the actuator and defining T-slot 26. Crossbar portion 35 has an upstream face 36 disposed preferably parallel to and closely spaced apart from recess wall 19. Preferably, surface 36 of the actuator slides over the planar surface of seat ring 21 as the actuator is moved toward and away from limiting position 15A.

The angle of the opening wedges or pads 33 is such as to ease or roll ball 16 out of its seat when opening the valve and to prevent spinning or chattering of the ball when the ball is held in partially open or full open position, centered with respect to the four pads 33. These wedges, and the angles thereof, are discussed more at length in the patents identified above.

In the valve illustrated in FIG. 1, it is assumed that the ball is engaged with seating surface 24 peripherally of the opening of the downstream or diverging portion 18 of fluid flow passage 11. Accordingly, actuator crossbar portion 35 has a concave under surface 39 exposed toward the opening of fluid passage portion 18. The lower portion of crossbar portion 35 between surfaces 36 and 39 defines a web portion 40. Web portion 40 has the downstream surface thereof (adjacent surface 39) surfaced with a hard facing material 41 such as "Satellite" facing material, and defines a ball contacting surface 42 which is disposed substantially parallel to the plane defined generally by seating surface 24. Expressed in another way, the ball contacting surface is disposed perpendicular to the direction in which ball 16 is moved as it engages seat surface 24. The extreme lower end of the hard surfacing material defines a ball moving surface 43 which is inclined upwardly toward recess surface 20 for camming the ball toward engagement with seating surface 24 as actuator 14 moves toward limiting position 15A. In a presently preferred form of the invention, surface 43 is inclined at an angle of about 40° from the axis of the flow stream through valve casing 10.

It is believed that the improvements provided by the present invention will be more clearly understood from a comparison of valves fabricated according to Patents 2,629,578 and 2,666,617 with the structure described above. Accordingly, such prior art valves are next discussed briefly prior to an explanation of the operation of valve 9 shown in FIG. 1.

FIG. 2 illustrates a portion of a prior art valve constructed according to the teachings of Patent 2,666,617. In FIG. 2 primed character numerals corresponding to the numerals of FIG. 1 are used to identify corresponding portions of the two structures. Seat ring 21' is provided in a valve casing for defining the opening of convergent portion 17' into the recess in which actuator 14' is disposed. The actuator has a surface 36' which cooperates in sliding relation to the exposed planar surface of seat ring 21'. Actuator 14' includes web portion 40' defined between surfaces 36' and 39'. A quantity of hard facing material 41', disposed on the side of web portion 40' adjacent surface 39', is inclined upwardly and rearwardly from the axis of fluid flow though the valve and defines wedging surface 42'. Surface 42' at its lower extent intersects a ball camming surface 43'. In a preferred valve fabricated according to the teachings of FIG. 2, surface 42' diverges from the vertical (perpendicular to the flow axis) at an angle of about 12°. Surface 43' diverges from the horizontal at an angle of about 40°.

The basic operation of the valves illustrated in FIGS. 1 and 2 is identical. Both valves make use of the Bernoulli theorem according to which a member (such as the ball) is urged away from the edge of a flowing stream toward the middle thereof by the faster flow and lower pressure area present there.

The Bernoulli effect, provided there is sufficient fluid velocity through the valve, normally holds ball 16 centrally of the opening wedges 33 even though the valve is in inverted position. As discussed more fully in the above-identified patents, when the valve is in its full open position the ball preferably projects slightly beyond a straight line drawn across the tops of venturi throats 17 and 18. This slight projection of the ball is for the purpose of engaging the ball with the vena contracta caused by the flow of fluid through the venturi.

To close valve 9 it is necessary only to move valve stem 15 downwardly to the position shown in FIG. 1. Assuming the fluid to be flowing in direction A, the fluid flow will tend to keep the ball off its seat 24 as actuator 14 is moved downwardly. Downward movement of the actuator moves the ball downwardly until it engages the upper end of spindle 31. The upper end of the spindle is so disposed as to cooperate with the actuator to deflect the ball from purely downward movement into lateral movement toward valve seat 24. This deflection of the ball by the upper end of spindle 31 is augmented by additional lateral deflection of the ball by engagement of surface 43 with the ball.

In valves constructed according to the above-identified patents, secure engagement of ball 16' with its seat was obtained by wedging action of surface 42' against ball 16' as actuator 14' was moved downwardly. Surface 42' and ball 16' were not engaged until the ball had moved into substantial engagement with its cooperating seat. A slight amount of downward movement of the actuator after surface 42' engaged the ball was relied upon to provide a thrusting force upon the ball to securely engage the ball with its seat. The force vectors applied to the ball by the structure illustrated in FIG. 2 forcing the ball into its seat comprised a force vector perpendicular to wedge surface 42' and a friction force parallel to the wedge surface. The resultant force is in a direction toward the lower part of the seat with which the ball is engaged and is thus inclined downwardly at an angle of more than 12° with respect to an axis normal to the valve seat.

As the load on the valve stem is increased, the ball is forced into its seat to effect a sealing closure of the fluid flow passage through the valve. Having reference to the structure shown in FIG. 2, if the load is increased beyond the load required to properly engage ball 16' with its seat, elastic strain of the seat member reaches a point where the seat seal becomes discontinuous at the top of the seat ring. In other words, when actuator 14' is lowered to close the valve, the ball comes to rest on its associated guide pin and is cammed toward its seat ring by the 40° camming surface 43' on the upstream side of the actuator. At the point where the camming surface engages ball 16', the ball is about 0.020" from hard contact with its full seating surface. To fully seat the ball, actuator travel is continued until the 12° ball contact surface 42' becomes engaged with the ball and forces the ball into its seat. As noted above, however, the orientation of surface 42' relative to the plane of the valve seat provides a downward load on the ball and causes a crescent shaped opening to be formed between the ball and the upper extremity of the seat when too much force is applied to the valve stem.

It has been found that most "overwedging" problems with the structure shown in FIG. 2 are caused by unskilled operators who feel that a leaking valve can be properly closed by merely tightening down harder on the valve stem. It is quickly seen, however, that additional force applied to the stem merely compounds the overwedging problem and produces even more leakage.

The present invention provides a ball seating mechanism which does not suffer from the problems of overwedging encountered in valve structures fabricated according to the teachings of the above-identified patents. The improved valve seating mechanism includes means acting on the ball in a direction substantially normal to the plane of the valve seat in response to movement of the actuator. The improved mechanism includes ball contacting surface 42 which is disposed substantially parallel to the plane of valve seat 24, together with means for pivoting the actuator so that surface 42 engages the ball to impart a force to the ball acting substantially normal to the plane of valve seat 24.

As illustrated in FIG. 1, spindle 31 passes upwardly from the bottom of valve casing 10 into recess 12 through aperture 30 in the bottom or hood portion 29 of actuator 14. Adjacent the bottom of the valve casing, the spindle provides a cam surface 50. The lower extent of the actuator defines a cooperating cam engaging surface 51. In the illustrated preferred form of the invention, cam surface 50 is provided by a conical portion of spindle 31. The elements of the surface of the cone are inclined at an angle of about 20° to the elongate extent of spindle 31. The structure illustrated provides cam surface 50 circumferentially of the spindle, but it will become apparent that the cam surface need be provided only on the side of the spindle disposed toward valve seat 24. It will also become apparent that cam surface 50 may be planar rather than cone-shaped. Cam engaging surface 51 is provided as the exterior surface of a quantity of hard facing material 52 disposed on the surface of aperture 30 adjacent valve seat 24. Since surface 51 cooperates with surface 50, it is inclined relative to the elongate extent of spindle 31 at an angle of about 20°.

To close valve 9, actuator 14 is moved downwardly of recess 12 toward limiting position 15A of the actuator. As the actuator is lowered, ball 16, normally supported on wedges 33, is raised from the wedges by engagement with the upper end of spindle 31. As the ball engages the spindle, the spindle and surface 43 cooperate to deflect the ball toward engagement with valve seat 24. Continued movement of the actuator toward limiting position 15A disposes ball contacting surface 42 behind the ball. Further downward movement of the actuator brings surfaces 50 and 51 into engagement so that the lower end of actuator 14 is moved to the right, as seen in FIG. 1, toward valve seat 24. Accordingly, the actuator is pivoted about the upper extent of seat ring 21 such that ball contact surface 42 moves into engagement with ball 16. Since the pivoting point of the actuator is disposed above the point of engagement between surface 42 and ball 16, the pivotal movement of the actuator imparts to the ball a force acting toward valve seat 24 along a line slightly inclined toward the upper extent of the valve seat. This force is represented in FIG. 1 by vector 55. Additional downward movement of the actuator relative to casing 10 provides additional pivotal movement of the actuator and causes surface 42 to slide relative to ball 16. Accordingly, a downwardly acting component of force, represented by vector 56, is produced by the friction between surface 42 and ball 16. The amount of downward movement of the actuator, however, is slight so that the magnitude of vector 55 is considerably larger than the magnitude of vector 56. Accordingly, the resultant force (shown by vector 57) imparted to the ball acts along a line substantially normal to valve seat 24. Thus, there is no tendency for one portion of the valve seat to be loaded to a greater extent than another portion and the ball is securely engaged with the valve seat along the entire extent of the valve seat. Further application of force to valve stem 15 does not produce any of the problems associated with the overwedging phenomena related to the prior art valve structure shown in FIG. 2.

In a presently preferred embodiment of the invention according to FIG. 1, it is believed that vector 55 acts along a line inclined about ½° from a plane normal to the valve seat. It is also believed that vector 56 acts along a line perpendicular to the direction of vector 55 and has a magnitude about one-tenth the magnitude of vector 55.

It was mentioned above that it is preferred that cam surface 50 and cam engaging surface 51 be inclined relative to the elongated extent of spindle 31 (and accordingly relative to the direction of reciprocal movement of the actuator) at an angle of about 20°. The 20° angle is arbitrarily selected to give maximum forward thrust without the danger of locking as would be the case where a very shallow angle, which might produce binding between the sliding surfaces, is provided.

From the foregoing explanation of the invention, it is apparent that the valve structure illustrated in FIG. 1 is merely a preferred embodiment of the present invention. The cam and cam engaging surfaces provided between the valve casing and the actuator may be disposed at some location other than between the ball deflecting spindle and the underside of the actuator. Further, it is preferred that the component of force related directly to movement of the ball contact surface into engagement with the ball have a subcomponent oriented in a direction opposite to the direction in which the actuator is moved in order to bring about engagement between ball contact surface 42 and ball 16. This is not essential but is preferred in order that the force component associated with frictional engagement between ball contact surface 42 and ball 16 be offset by the oppositely effective component of the force represented by vector 55.

The invention has been described above in conjunction with a presently preferred embodiment. It is to be understood, however, that other types of valves may be equipped with the improved ball seating mechanism without departing from the scope of the present invention.

What is claimed is:

1. In a valve having a casing defining a fluid flow passage therethrough and a recess intersecting the flow passage, said passage defining inlet and outlet openings to the recess, an annular valve seat peripherally of one opening, a ball disposed in the recess, and selectively operable means carrying the ball and movable reciprocably in the recess essentially along a line parallel to the valve seat for moving the ball along said line toward and away from closure relation with the valve seat, the improvement comprising means acting on the ball substantially normal to the valve seat in response to operation of the selectively operable means to move the ball toward the valve seat for urging the ball into intimate sealing contact with the valve seat.

2. In a valve having a casing defining a substantially straight flow passage therethrough and a recess transversely intersecting the flow passage, said passage defining inlet and outlet openings to the recess, an annular valve seat peripherally of one opening, the valve seat being disposed generally in a plane parallel to the recess, a ball disposed in the recess, an actuator means coupled to the ball mounted in the recess for reciprocal movement parallel to the plane of the valve seat and selectively operable for moving the ball into and out of closure relation with the valve seat, the improvement comprising means mounted to the actuator means acting on the ball in a direction substantially normal to the plane of the valve seat in response to movement of the actuator means for urging the ball into intimate sealing contact with the valve seat.

3. In a valve having a casing defining a substantially straight flow passage therethrough and a recess transversely intersecting the flow pssage, said passage defining inlet and outlet openings to the recess, an annular valve seat peripherally of one opening, the valve seat being disposed generally in a plane perpendicular to the flow passage, a ball having a diameter greater than the diameter of the valve seat disposed in the recess, actuator means mounted in the recess for reciprocal movement transversely of the flow passage and engaging the ball, and selectively operable means connected to the actuator means for reciprocating the actuator means for moving the ball into and out of closure relation with the valve seat, the improvement comprising a ball contacting surface on the actuator means located so that the ball is disposed between the contacting surface and the valve seat, the contacting surface being disposed substantially perpendicular to the flow passage, and cam means operable between the casing and the actuator means for moving the contacting surface into engagement with the ball as the actuator means is moved in response to operation of the selectively operable means to move the ball into closure relation with the valve seat, engagement of the contacting surface with the ball imposing a force on the ball in a direction substantially normal to the plane of the valve seat.

4. A valve having a casing defining a flow passage therethrough and a recess transversely intersecting the passage to form opposed throats, each throat having a substantially circular opening into the recess, one of the throat openings constituting a valve seat, a ball in the recess seatable on the seat, an actuator in the recess movable transversely of the flow passage toward and away from a limiting position in which the ball is seated on the seat, the actuator being in the form of a cage having abutments spaced apart transversely of the direction of movement of the actuator and transversely of the flow passage, the actuator defining a ball contacting surface disposed substantially parallel to the seat and facing the seat, the ball being loosely confined between the abutments and the contacting surface, projection means extended from the casing into the recess for engaging the ball as the actuator approaches its limiting position for moving the ball toward engagement with the seat, the ball being disposed between the seat and the contacting surface as the ball moves toward engagement with the seat, and cam means connected to the casing and engageable with the actuator for pivoting the actuator relative to the casing as the actuator moves into its limiting position so that the contacting surface engages the ball and urges the ball into closure relation with the seat with a force acting substantially normally of the seat.

5. A valve having a casing defining a flow passage therethrough and a recess transversely intersecting the passage to form opposed throats, each throat having a substantially circular opening into the recess, one of the throat openings constituting a valve seat, a ball in the recess seatable on the seat, an actuator in the recess movable transversely of the flow passage toward and away from a limiting position in which the ball is seated on the seat, the actuator being in the form of a cage having abutments spaced apart transversely of the direction of movement of the actuator and transversely of the flow passage, the actuator defining a ball contacting surface disposed substantially parallel to the seat and facing the seat, the ball being loosely confined between the abutments and the contacting surface, projection means extended from the casing into the recess for engaging the ball as the actuator approaches its limiting position for moving the ball toward engagement with the seat, the ball being disposed between the seat and the contacting surface as the ball moves toward engagement with the seat, and cam means connected to the casing and engageable with the actuator for pivoting the actuator relative to the casing as the actuator moves into its limiting position so that the contacting surface engages the ball and urges the ball into closure relation with the seat with a force acting substantially normally of the seat, the actuator pivoting so that the force has a component vector oriented in a direction opposite to the direction the actuator moves as it moves into its limiting position.

6. A valve having a casing having an upper end and a lower end and defining a flow passage therethrough, the casing also defining a recess transversely intersecting the passage to form opposed throats, each throat having a substantially circular opening into the recess, one of the throat openings constituting a valve seat, a ball in the recess seatable on the seat, an actuator in the recess having upper and lower ends and being reciprocably movable transversely of the flow passage toward and away from a limiting position of reciprocal movement in which the lower end of the actuator is disposed adjacent the lower end of the casing and in which the ball is seated on the seat, the actuator being in the form of a cage having abutments spaced apart transversely of the direction of movement of the actuator and transversely of the flow passage, the actuator defining a ball contacting surface disposed substantially parallel to the seat and facing the seat, the ball being loosely confined between the abutments and the contacting surface, an elongated spindle member extending into the recess from the lower end of the casing having an upper end disposed in the recess adjacent the valve seat for engaging the ball as the actuator approaches its limiting position for moving the ball toward engagement with the seat, the ball being disposed between the seat and the contacting surface as the ball moves toward engagement with the seat, the lower end of the actuator defining an aperture through which the spindle member extends, the spindle member adjacent the lower end of the casing defining a cam surface inclined downwardly away from the elongate extent of the spindle and facing the valve seat, and a cooperating cam engaging surface defined by the lower end of the actuator, engagement of the cam and cam engaging surfaces as the actuator moves into its limiting position causing the actuator to be pivoted toward the valve seat about a pivot point adjacent the upper end of the actuator for engaging the ball contacting surface with the ball and for urging the ball into closure relation with the seat.

7. In a valve having a casing defining a substantially straight flow passage therethrough and a recess transversely intersecting the flow passage, said passage defining inlet and outlet openings to the recess, an annular valve seat peripherally of one opening, the valve seat being disposed generally in a plane perpendicular to the flow passage, a ball having a diameter greater than the diameter of the valve seat disposed in the recess, actuator means mounted in the recess for reciprocal movement transversely of the flow passage and engaging the ball, and selectively operable means connected to the actuator means for reciprocating the actuator means for moving the ball into and out of closure relation with the valve seat, the improvement comprising a ball contacting surface on the actuator means located so that the ball is disposed between the contacting surface and the valve seat, the contacting surface being disposed substantially perpendicular to the flow passage, and cam means operable between the casing and the actuator means for moving the contacting surface into engagement with the ball comprising a cam surface defined by one of the casing and the actuator means and a cooperating cam engageable surface in the other of the casing and actuating means, engagement of the cam and cam engageable surfaces occurring progressively as the actuator means is operated to move the ball into closure relation with the valve seat for moving the ball contacting surface toward the valve seat and into engagement with the ball, engagement of the contacting surface with the ball imposing a force on the ball in a direction substantially normal to the plane of the valve seat.

8. A valve according to claim 7 wherein the cam and cam engageable surfaces are disposed on the casing and actuator means so that the force imposed on the ball has a component vector oriented generally opposite to the direction of movement of the actuator means producing movement of the ball into closure relation with the valve seat.

9. In a valve having a casing defining a substantially straight flow passage therethrough and a recess transversely intersecting the flow passage, said passage defining inlet and outlet openings to the recess, an annular valve seat peripherally of one opening, the valve seat being disposed generally in a plane perpendicular to the flow passage, a ball having a diameter greater than the diameter of the valve seat disposed in the recess, actuator means mounted in the recess for reciprocal movement transversely of the flow passage and engaging the ball, and selectively operable means connected to the actuator means for reciprocating the actuator means for moving the ball into and out of closure relation with the valve seat, the improvement comprising a ball contacting surface on the actuator means located so that the ball is disposed between the contacting surface and the valve seat, the contacting surface being disposed substantially perpendicular to the flow passage, and cam means operable between the casing and the actuator means for moving the contacting surface into engagement with the ball comprising a cam projection in the recess extending toward the actuator means from a portion of the casing toward which the actuator means moves as the ball is moved into closure relation with the valve seat, and a cam engageable surface disposed on the actuator means for cooperation with the cam projection, progressive engagement of the cam projection and the cam engageable surface pivoting the actuator means toward the valve seat and engaging the ball contacting surface with the ball, engagement of the contacting surface with the ball imposing a force on the ball in a direction substantially normal to the plane of the valve seat.

References Cited by the Examiner
UNITED STATES PATENTS

| | | | |
|---|---|---|---|
| 1,488,008 | 3/1924 | Jones. | |
| 2,011,601 | 8/1935 | Williams | 251—204 |
| 2,629,578 | 2/1953 | Paul | 251—124 |
| 2,666,617 | 1/1954 | Paul | 137—271 |

WILLIAM F. O'DEA, *Primary Examiner.*

CLARENCE GORDON, *Examiner.*

UNITED STATES PATENT OFFICE
CERTIFICATE OF CORRECTION

Patent No. 3,273,851　　　　　　　　　　　September 20, 1966

Francis Clifford Rosch, Jr., et al.

It is hereby certified that error appears in the above numbered patent requiring correction and that the said Letters Patent should read as corrected below.

Column 1, line 21, for "flund" read -- fluid --; column 2, line 9, for "traverse" read -- transverse --; line 36, for "surfaces" read -- surface --; column 3, line 37, for "Satellite" read -- Stellite --; line 71, for "though" read -- through --; column 6, line 74, for "pssage" read -- passage --.

Signed and sealed this 29th day of August 1967.

(SEAL)
Attest:

ERNEST W. SWIDER　　　　　　　　　　　EDWARD J. BRENNER
Attesting Officer　　　　　　　　　　　　Commissioner of Patents